March 31, 1964  R. A. PANNIER ETAL  3,126,822
GAUGE STOP HOT METAL STAMP
Filed Aug. 23, 1960  3 Sheets-Sheet 1

INVENTORS
RALPH A. PANNIER &
GEORGE E. MARTIN
BY
THEIR ATTORNEY

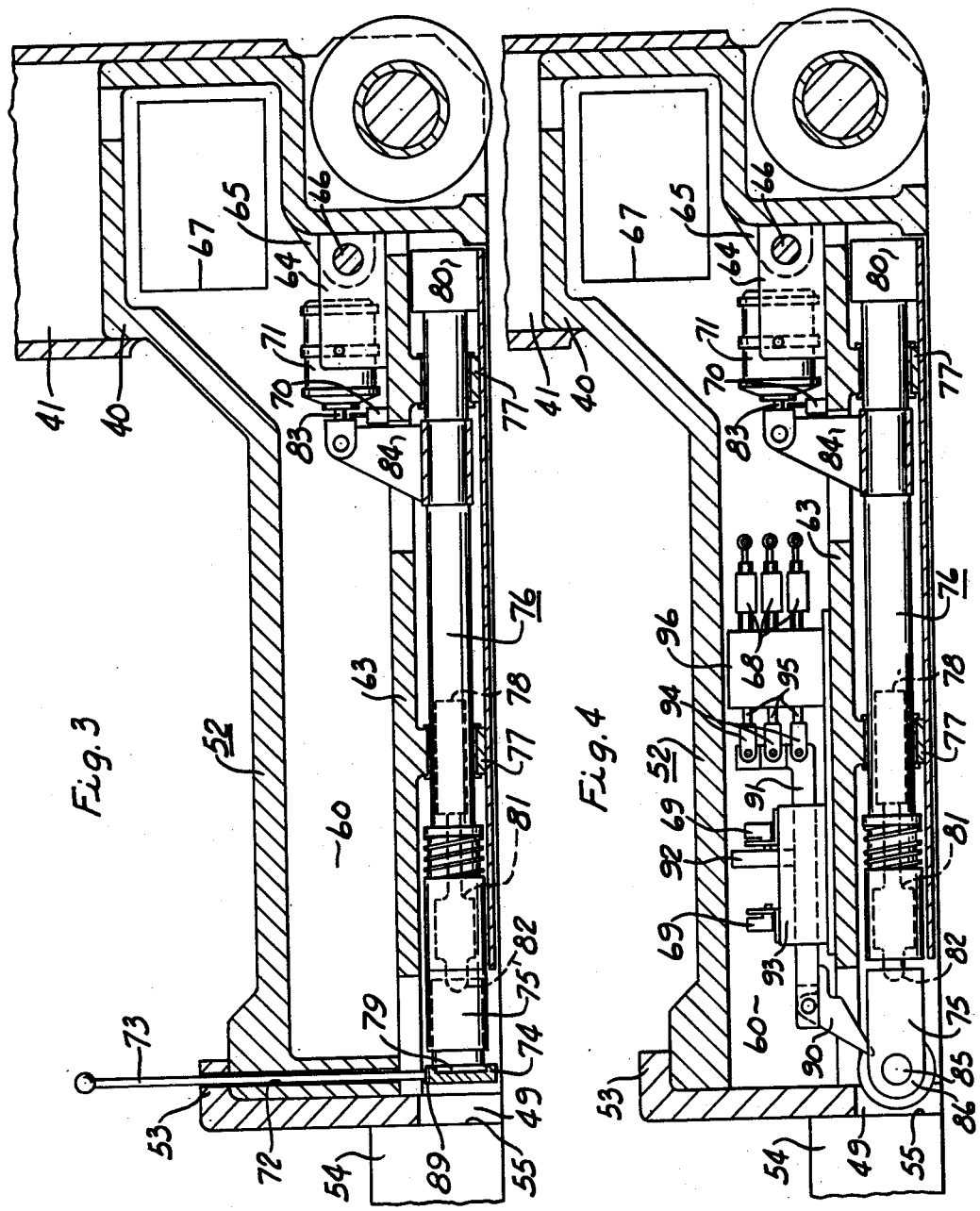

INVENTORS
RALPH A. PANNIER &
GEORGE E. MARTIN
BY William D. Carothers
THEIR ATTORNEY

United States Patent Office 3,126,822
Patented Mar. 31, 1964

3,126,822
GAUGE STOP HOT METAL STAMP
Ralph A. Pannier, McCandless Township, Allegheny County, and George E. Martin, Pittsburgh, Pa., assignors to The Pannier Corporation, Pittsburgh, Pa., a corporation of Pennsylvania
Filed Aug. 23, 1960, Ser. No. 51,332
13 Claims. (Cl. 101—4)

This invention relates generally to hot rolled metal stamping machines and more particularly to a stamping machine combined with a gauge stop to mark the hot metal when stopped by the gauge stop.

Hot rolled metal passing through the mill is difficult to stamp. If it is traveling along a table at the end of a mill run it may be too cold or it is necessary to travel the stamper with the piece to accomplish the stamping operation. Again the edge to be stamped is not always properly presented. Thus at different work stations through the mill there are many additional impediments to the operation of stamping the hot metal.

To overcome these difficulties it has been discovered that a gauge or stop, even though adjustable and retractable, provides an ideal combination with a stamping machine. Such a gauge or stop used in combination with a hot shear presents the stamp at a most ideal time. The hot metal edge to be stamped is fresh, clean, and uniform, just having been sheared. The metal must be at a predetermined temperature to be sheared which is an ideal time to stamp the same for the metal has ample heat.

The metal must be substantially squared at the gauge or stop so that a swiveled stamp will produce an accurate stamping.

Removable plate stamps may be set in the face of the stop but when the stop or hot metal or both are moved vertically relative to each other the stamping in the hot metal has a tendency to drag the stamping characters and destroy the same. Again the stamp stays in contact all the while the metal is against the stop.

The hot metal stamp comprising this invention is carried by the gauge or stop but is receded and the striking of the hot metal against the gauge or stop indicates the stamp to come forward, square itself against the hot metal, then stamp the same. This may be accomplished by a removable plate type stamp or a remotely controlled presetting wheel stamp.

The gauge or stop at a hot metal shear must be capable of quick adjustment relative to the shear to gauge the length of the stock cut. It should also be retractable to permit the stamped and severed stock to pass from the shear. The gauge and stop must be capable of allowing the table and stock to move during the shearing action without injury to the stamped impression or the stamping characters.

If a removable plate carrying the indicia to be stamped is to be employed it is positioned in a window in the gauge and stop and biased by springs to be withdrawn from the window. When the freshly sheared surface of the stock passes through the shear and engages the stop a hammer moves the retracted pale through the window with its characters into flat engagement with the steel and a blow is then given by the hammer to complete the impression and the hammer is withdrawn and the spring biased plate retracted.

If the marking device is a head having a series of character wheels a device is provided for resetting the character wheels when the head is retracted for the next consecutive member to be marked.

When using replaceable marking plates one plate is usually used for a series of pieces sheared from the same stock or bloom, billet, or ingot. These marking plates may be changed manually or with lateral slides.

In this manner the marker is combined with the gauge or stop and is remotely controlled and can be changed between shears without inserting additional or a material increase in the shearing cycle time.

Other objects and advantages appear hereinafter in the following description and claims.

The accompanying drawings show for the purpose of exemplification without limiting the claims thereto certain practical embodiments illustrating the principles of this invention wherein:

FIG. 3 is an enlarged sectional view of the gauge and stop with a plate stamping mechanism.

FIG. 4 is an enlarged sectional view of the gauge and stop with a stamping head having a plurality of character wheels and their changing mechanism.

Figures 1, 2:
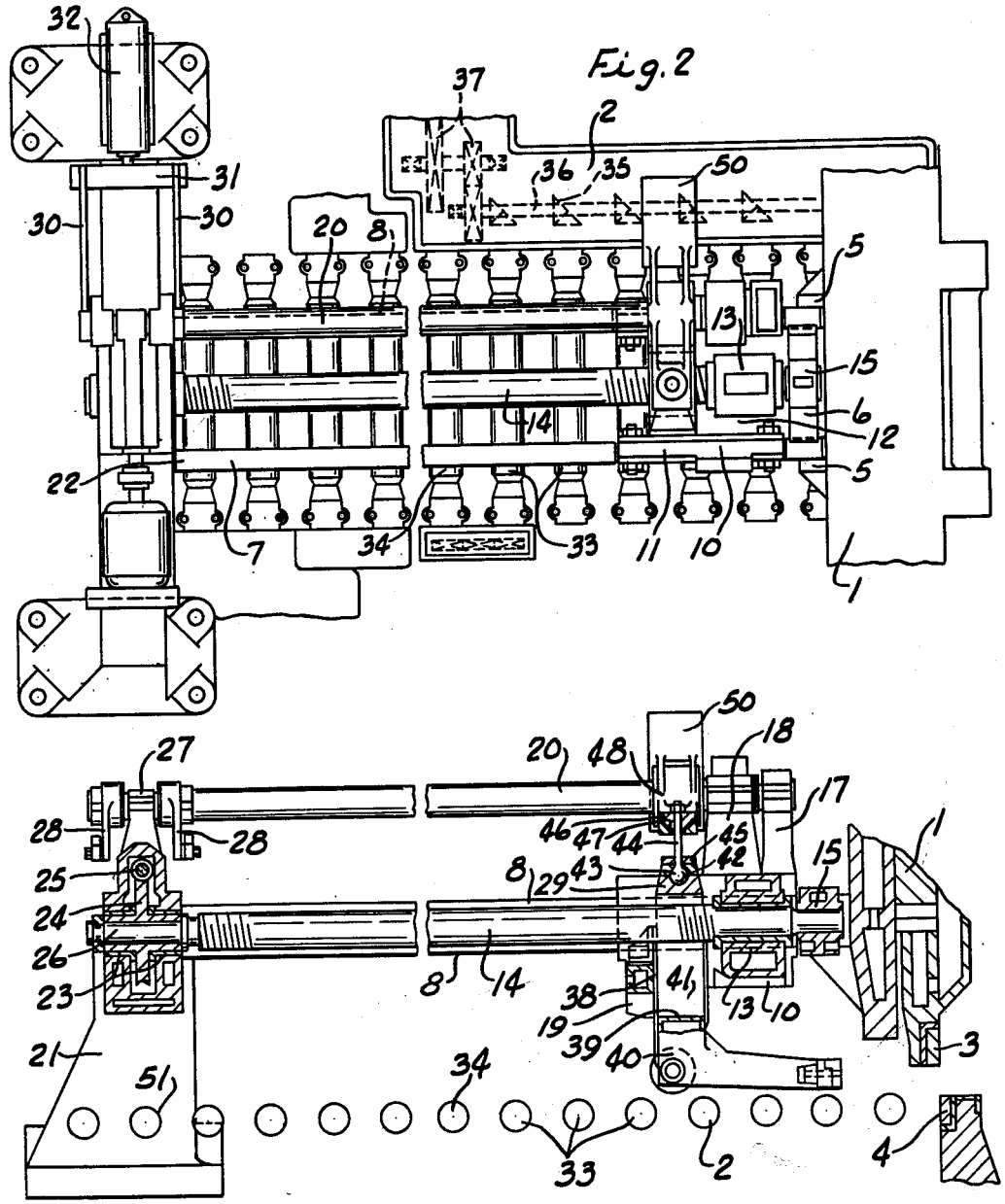
FIG. 1 is a view in vertical section of a shear with its gauge and stop.
FIG. 2 is a plan view of the structure shown in FIG. 1.

Referring to FIG. 1 the shear housing 1 bridges the table 2 and encloses the downwardly movable shear blade 3 and the stationary shear blade 4. This housing also carries the outboard supports 5 carrying the transverse head member 6 that is secured to and supports the parallel track members 7 and 8 that slidably support the carriage 10 that moves longitudinally over the table 2. The carriage is provided with bearing members 11 that engage each of the rails 7 and 8 and also supports an intermediate section 12 for receiving the nut and housing 13 that threadably rides on the rotary threaded shaft 14 which is carried by the transverse head member 6 in the bearing 15. The rail member 8 also carries the bearing stands 17 and 18 which rotatably support the outer end of the kelly bar 20.

The opposite end of the rail members 7 and 8 and the threaded shaft 14 together with the kelly bar 20 are rotatably supported by the stand 21 in which the rails are inserted as indicated at 22 and in which the shaft 14 is journaled in the spaced bearings 23 that carries the worm gear 24 driven by the worm 25 and the end of the threaded shaft 14 is secured in the worm wheel 24 as indicated at 26.

The kelly bar is likewise journaled in the bearing 27 and is provided with two depending crank arms 28 which have pivotally connected at their lower ends the connecting rods 30 the opposite ends of which are joined by a crosshead 31 actuated by the fluid actuated cylinder 32 which is preferably pneumatic.

The table 2 is made up of a series of rollers 33, the last one in the series 34 has a shaft which functions as a pivot for the table 2 the whole of the table being capable of swinging downwardly about the rotary axis of the roller 34 when the shear blade 3 descends to cut the stock. Each of the rollers are driven through the bevel gear arrangement indicated at 35 on the shaft 36 which is in turn connected through the train of gears 37 to a suitable drive.

The carriage 10 is provided with a vertical central opening 38 for the purpose of slidably receiving for vertical reciprocation the gauge and stop member 40 which comprises a vertically disposed O-shaped stem 41 that is open in the center as indicated by the vertically extended horizontal opening 19 bounded at the top by the bridge member 29 and at the bottom by the box member 39 which members define this opening 19 and are shown in section and provide circumferential clearance to receive the threaded shaft 14 and the bridge 29 across the upper end thereof being provided with a spherical socket 42 to receive the hanger ball 43 on the end of the stem 44. A cap 45 is employed to fit the upper end of the ball 43 and secure the same in the socket 42 but allow it to swivel relative thereto. The stem 44 in turn is passed through a spherical yoke 46 mounted in a spherical socket 47 of the crank arm 48. The opposite end of the crank arm is provided with a counterweight 50. Thus by actuating the fluid cylinder 32 the kelly bar 20 may be rotated and the crank 48 which is fitted to the kelly bar but slidable therealong is thus caused to rotate with the kelly bar and thus raise the gauge and stop 40 to the full throw of the crank arm 48. This permits the severed stock to pass under the gauge and stop and travel downwardly across the table 2 and along the rollers making up the table 51 thus removing the severed piece from the vicinity of the shear.

In order to move the carriage 10 along the rails 7 and 8 the bearing stand 17 is stationary and remains supported by the track 8 whereas the bearing stand 18 is carried by the carriage 10 and slides along the kelly bar with the crank member 48.

Referring specifically to FIG. 3 the gauge and stop 40 is preferably made as a hollow casting which has the vertical O-shaped stem portion 41 and the forwardly projecting foot portion 52 the latter being closed at its outer end by the bumper shoe member 53 which is engaged by the hot rolled metal 54 the surface 55 of which has just been sheared. The shoe 53 placed on the front of the foot 52 has ample strength to withstand the impact of the hot metal against its surface. This shoe is readily removable and replaceable. The shoe 53 is provided with an opening or window 49 that is sufficiently large to admit the character wheels or marking plate when the same is extended outwardly through the shoe and into engagement with the surface 55 of the hot metal 54 for the purpose of marking the same.

Figure 5:
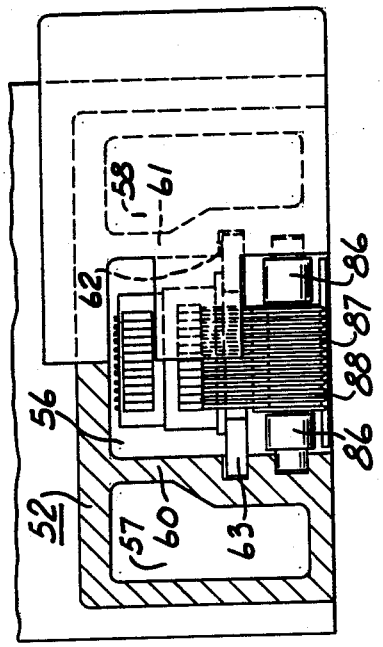
FIG. 5 is an end view of the structure of FIG. 4.

The foot 52 is provided with a plurality of longitudinally disposed chambers including the central chamber 56 and the side chambers 57 and 58 as illustrated in FIG. 5. The partition walls 60 and 61 which form the chamber 56 are provided with the inwardly open longitudinal slots 62 for receiving the plate member or slide 63 which is slidable into the foot for the full length thereof when the shoe 53 is removed. This slidable plate 63 at its rear end is provided with a pair of spaced parallel brackets 64 that support the cylinder 71 and fit on opposite sides of the ears 65 on foot 52 as shown in FIGS. 3 and 4. The brackets 64 and the ears 65 and the foot 52 are provided with aligned openings to receive the plate assembly pin 66 which passes therethrough and functions as a lock. This pin may be withdrawn from the foot of the gauge and stop 40 and permit the plate or slide 63 to be completely withdrawn from the foot and replaced by a similar stamping structure. The plate or slide 63 has mounted thereon the complete operating structure of the stamping machine and one may couple and uncouple the same through the access door 67 to disconnect the plugs for the electrical circuit carried to the three way solenoid valves 68 and the other circuits such as the limit switches 69 and 70. The access door 67 may also be employed to distribute a cooling fluid over the stamping mechanism within the chambers of the stop 40.

A rapid disconnect is also provided for the fluid connection to the operating cylinder 71. Thus when the shoe 53 is removed and the pin 66 is withdrawn and by disconnecting the plugs and the fluid lines one may slide the plate 63 and the hole of the stamping structure attached thereto for replacement or repairs.

In the structure shown in FIG. 3 a lateral slot 72 is provided for receiving the support 73 that carry the plates 74 having the indicia thereon. The plate 74 is positioned by the support 73 directly in front of the swiveled head 75' which with said plate 74 constitutes a marking head on the end of the pneumatic hammer 76 that is carried by the depending bearing members 77 formed integral with the under side of the plate or slide 63. The lower end of these bearings is provided with a cap which is bolted to the upper half so that the cylinder of the hammer 76 of the hammer may be removed.

The cylinder of the hammer carries the free piston indicated at 78 which is moved from one end to the other by pneumatic pressure supplied to the rear end of the cylinder by a valve mechanism in the valve box 80 at the rear end of the cylinder. When the free piston 78 strikes the plunger 81 it forces the marker head 75' forwardly to impress the indicia on the card or plate 74 against the face 55 of the hot metal 54. The plunger 81 has a spherical end 82 which is received in the head 75' to permit the plate 74 and the head 75' to properly face itself on the surface 55 of the hot metal to be marked.

To pre-position the plate 74 with the indicia against the surface 55 of the hot metal the cylinder 71 is expanded, the piston 83 of which moves the clevis arm 84 attached to the cylinder of the hammer 76 and bodily moves the whole of the cylinder and hammer forward. The marker head 75' picks up the plate 74, enters a supporting socket 79 in the back of the marking plate 74 to disconnect the same at the detachable joint 89 and carries it from the support 73 into engagement with the surface 55 permitting the spherical mating surfaces 82 between the piston and the head to properly center the plate against the face 55 of the metal to be marked. The support 73 that carries the plate 74 encircles and retains this plate 74 but permits the head 75' on the end of the pneumatic hammer 76 to enter the socket 79 on the back of the plate 74 and move the plate forward to impress indicia thereon against the steel. U.S. Patents 347,837 and 2,661,681 both show removable die members having sockets similar to socket 79 for receiving plungers similar to plunger 75' for the purpose of receiving the die and stamping the indicia of the die member on a workpiece. At this time the pneumatic valve is actuated to force the free piston 78 to strike the plunger and thereby impress the indicia on the plate in the surface 55 of the hot metal. After this blow the hammer is immediately retracted by the cylinder 71 and the plate 74 is replaced in the detachable joint 89 on the support 73 which may be removed through the slots 72 for changing. When the support 73 carrying the plate 74 is raised up through the slot 72 the plate 74 may be readily replaced to provide different indicia for subsequent stamping.

In the structure of FIGS. 4 to 7 the hammer and cylinder 76 is the same. However, the bifurcated character marker head 75 is provided with a transverse shaft 85 mounted in spaced arms 86 of the bifurcated marker for supporting the plurality of character wheels 87 which with the head constitutes the marker head as shown in FIG. 5. Each character wheel is provided with a ratchet wheel 88 to be engaged by their respective dog members 90 that are pivotally supported on the bar slides 91 each of which has an arm 92 that projects upwardly through the guide or bearing box 93 for the purpose of engaging the opposed limit switches 69. These limit switches are arranged to count the reciprocal operations of their respective bar slides for the purpose of actuating a step relay to produce through an electrical circuit a visual counter that shows the exact setting of each of the character wheels 87 at the remote or operating station.

Each of the bar slides 91 are independently connected through the clevis 94 to the pistons 95 in the air cylinders 96 each of which is actuated by the electrically operated solenoid valve 68. Thus the operator at the remote control station can pre-position each of the character wheels 87 through the reciprocating bar slides 91 and the ratchet members 90 to present the proper indicia for stamping. Again this may be set up as a card control for properly setting the head and checking the stamping by means of the aforementioned circuits.

None of the three way valve solenoids 68 can be actuated unless the limit switch 70 is operated when the piston 83 of the fluid pressure cylinder 71 is retracted so that the pawls are in operative position relative to the ratchet gears of each of the character wheels. Thus the pawls and slides cannot get out of step with the character wheels that they operate and the limit switches 69 thereby accurately present the same indicia at the control station as occurs on the character wheels carried by the marker head 75.

Figure 7:
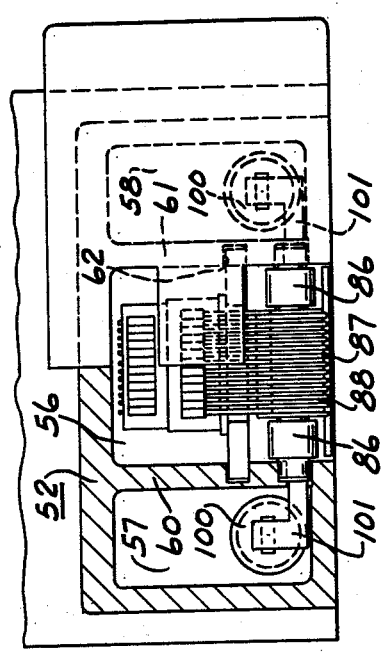
FIG. 7 is an end view of the structure of FIG. 6.
Figure 6:
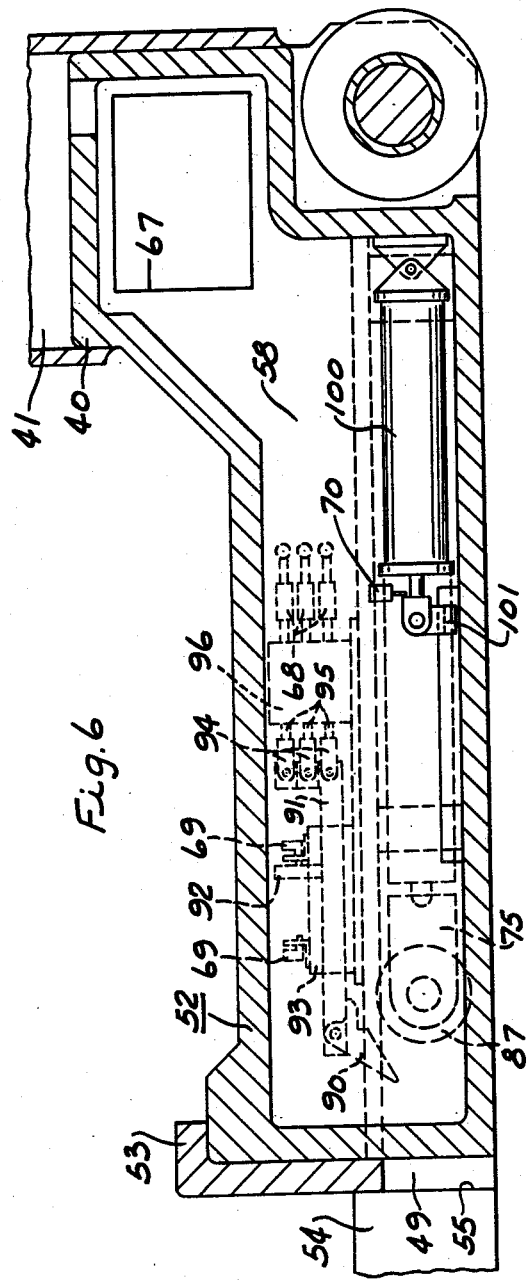
FIG. 6 is a sectional view of a modified form of stamping hammer operating mechanism.

In the structure shown in FIGS. 6 and 7 the cylinders 71 have been replaced by the cylinders 100 in each of the chambers 57 and 58 of the foot 52. The vertical walls 60 and 61 are provided with slots to receive the crosshead mechanism 101 which extends into the central chamber 56 and supports the marker head 75 in the same manner as that previously described. The cylinders 100 proportionately carry the load in driving the marker head 75 outwardly to mark the face 55 of the hot metal 54 without the use of the hammer and its corresponding cylinder 76. Thus the single actuation of the cylinders 100 in unison force the head outwardly to insert the stamp on the hot metal with one and the same blow. When the head is retracted as shown in FIG. 6 a changing mechanism is capable of adjusting the character wheels 87 in the same manner described with respect to FIG. 4 and the crosshead 101 functions as the member to operate the limit switch 70. One particular advantage of a structure of this character is that the marking head is retracted materially from the window in the shoe.

The marking head 75' of the structure of FIG. 3 and the marking head 75 of structures in FIGS. 4 and 6 each function to support the indicia applying members in the form of the plate 74 of the structure of FIG. 3 and the character wheels 87 of the structure of FIGS. 4 and 6.

The cylinders 71 of FIGS. 3 and 4 and the cylinders 100 of FIG. 7 as well as the hammer 76 of each of these views are either or both considered as the power means to project the stamping characters for engagement in stamping.

We claim:

1. A hot rolled metal stamping machine consisting of a table over which the hot rolled metal passes, a stop having a chamber and adjustably supported to be inserted in the path of movement of the hot rolled metal on said table, a shoe on said stop having a face to be engaged by the end of the hot rolled metal on said table to gauge and stop the same, said shoe closing the front of said chamber, means defining an opening in the face of said shoe, stamp means supported in said stop chamber and having stamping characters framed in said opening but receded from the stop face of said shoe, power means to project said stamping characters through said opening and into engagement with the hot rolled metal engaging said shoe face to stamp the same and then retract said stamping characters from said opening and a slide plate demountable in said chamber to carry said stamping means and said power means.

2. The stamping machine of claim 1 characterized in that said power means includes a stamping hammer.

3. A gauge and stop stamping machine for hot rolled metal comprising an adjustably supported hollow foot having a shoe enclosing one end and having a face to engage the hot metal, a slide plate fitted to pass into said foot when said shoe is removed, a lock to hold said slide plate in place, a remote controlled stamping mechanism having stamping characters and carried by said slide plate, said shoe having an opening in said face and through which the stamping characters of stamping mechanism pass when actuated.

4. A hot rolled metal stamping machine comprising a table made up of a series of rolls over which the hot metal passes for shearing at one end of said table, a hollow foot adjustably supported over said table and having a shoe on the end thereof to be inserted in the path of the hot metal traveling through said shear to gauge and stop the same for shearing, a slide plate detachably inserted in said foot, a marker mechanism mounted on said slide plate and having a reciprocable marker head, said shoe having an opening therein to admit said marker head to reciprocate to stamp the hot metal stopped by said foot.

5. The stamping mechanism of claim 4 characterized by a swivel supporting said marker head on said marking mechanism to square the characters against the hot metal to be stamped.

6. The stamping machine of claim 4 characterized in that said stamping mechanism includes power means mounted on said slide plate, a marking hammer reciprocally mounted on said slide plate and reciprocated by said power means to extend said marker head through said opening to engage the hot metal to stamp the same.

7. The stamping mechanism of claim 6 characterized by a swivel supporting said marker head on said hammer to square the characters against the hot metal, and a free piston carried by said hammer to strike said marker head and produce the stamping.

8. The stamping machine of claim 4 characterized in that said stamping mechanism includes a crosshead reciprocably mounted on said slide plate, a swivel carried by said crosshead for supporting said marker head to square the characters against the hot metal to be stamped, and power means to reciprocate said crosshead.

9. The stamping machine of claim 8 characterized in that said power means is a double acting fluid operated cylinder and piston means to extend said crosshead and square the characters against the hot metal and stamp the same in one continuous movement and then retract.

10. A hot rolled metal stamping machine for use in stopping and gauging hot metal from a shear, consisting of a foot adjustably mounted behind said shear to be inserted in the path of the metal passing through the shear to stop the same at a predetermined point, a shoe on said foot to engage and stop the metal and having an opening therethrough, a marker mechanism in said foot having stamp characters for impressing on the sheared end of the metal and reciprocably mounted to move said characters through said opening to mark said metal, actuating means to reciprocate said stamp characters to stamp the metal and return and a slide plate demountable in said foot to carry said marker mechanism and said actuating means.

11. The stamping machine of claim 10 characterized by a swivel to support the stamp characters to squarely face them on the metal.

12. The stamping machine of claim 11 characterized in that said marker mechanism includes a hammer slidable to reciprocate said stamp characters into position for stamping engagement and a free piston to then consecutively strike a blow to impress the stamp characters on the metal before the same are withdrawn back through the opening into said foot.

13. The stamping machine of claim 11 characterized in that said marker mechanism includes piston cylinder means connected to a crosshead which reciprocates said stamp characters into engagement with the metal to impress the stamp characters and withdraw the same back through the opening into said foot.

References Cited in the file of this patent

UNITED STATES PATENTS

| | | |
|---|---|---|
| 807,850 | McCaffrey | Dec. 19, 1905 |
| 1,618,845 | Rice et al. | Feb. 22, 1927 |
| 2,443,779 | Sanders et al. | June 22, 1948 |
| 2,546,114 | Triplett et al. | Mar. 20, 1951 |
| 2,818,014 | Jacquart | Dec. 31, 1957 |